March 12, 1929. A. H. ATZENHOFFER 1,704,997
WEATHER STRIP
Filed June 14, 1926

INVENTOR
A. H. ATZENHOFFER
BY
ATTORNEYS

Patented Mar. 12, 1929.

1,704,997

UNITED STATES PATENT OFFICE.

ARTHUR HERMAN ATZENHOFFER, OF CHICAGO, ILLINOIS.

WEATHER STRIP.

Application filed June 14, 1926. Serial No. 115,966.

My invention relates to improvements in weather strips, and it consists in the combinations, constructions, and arrangements herein described and claimed.

In the manufacture of closed bodies for automobiles, there are two classes of window strips used which I propose to make in a new and novel manner, namely by the combined use of soft rubber and hard rubber in various portions of the strip and vulcanized together so that the finished product is an integral mass. By doing this, I obtain the advantage of the flexibility and elasticity of the soft rubber, and a semi-rigid or stiff quality of the hard rubber.

An object of my invention is to provide a weather strip which has substantially semi-frictionless portions so as to allow glass or a similar hard material to slide reasonably free while in contact therewith, and a resilient portion which tends to hold the substantially frictionless portions in normal position.

A further object of my invention is to provide a weather strip of the type described which will form a seal against the weather and hold the glass firmly, and reduce the tendency of the glass to rattle or vibrate.

A further object of my invention is to provide a weather strip which is especially adapted for use on automobile bodies, and which may be used on doors and windows of buildings.

Other objects and advantages will appear in the following specification, and the novel features of the invention will be particularly pointed out in the appended claims.

Figure 2:
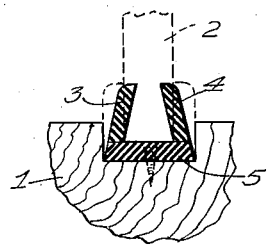
Figure 1:
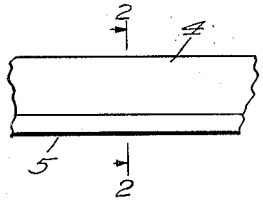
Figure 3:
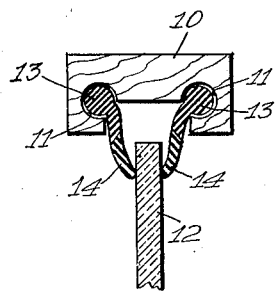

My invention is illustrated in the accompanying drawings, forming part of this application, in which Figure 1 is a side elevation of a portion of my preferred form of weather strip, Figure 2 is a section along the line 2—2 of Figure 1, and Figure 3 is a modified form of my device.

In carrying out my invention, I make use of the framework of an automobile body, indicated at 1, and a window 2, shown in dotted lines.

I provide lips 3 and 4 which are preferably formed of hard rubber. The hard rubber material of the lips 3 and 4 is sufficiently resilient to permit the lips to be bent slightly if desired. A soft rubber base 5 is provided and is vulcanized to the lips 3 and 4 in such a manner that the lips are tapered inwardly toward each other, as clearly shown in Figure 2.

From the foregoing description of the various parts of the device, the operation thereof may be readily understood. The body portion 5 may be secured to the framework 1 by any suitable means, such as a screw. To insert the window 2 in place, the lips 3 and 4 are forced away from each other and released when the window is disposed therebetween. When the lips 3 and 4 are released, they are held against the surfaces of the window 2, due to the resiliency of the base 5. In this manner, a substantially air-tight seal is formed, and the window is held against vibration.

The hard rubber lips form substantially frictionless contacting surfaces, thus permitting the window 2 to be readily raised and lowered at will.

In Figure 3, I have shown a modified form of my device in which I make use of a framework 10 having recesses 11 therein. A window 12, such as a slidable glass window of an automobile, is provided. I provide base portions 13 which are formed of resilient substantially soft rubber. Lips 14, which are preferably formed of hard rubber, are vulcanized or secured to the base portions 13 in any suitable manner.

The lips 14 are held against the window 12, due to the resiliency of the base portions 13, and in this manner, a substantially air-tight seal is formed. The lips 14, however, are substantially frictionless, thus permitting the window 12 to be readily moved.

It will be observed that when the lips are vulcanized or secured to their respective base portions they form a substantially integral device.

I claim:

1. A device of the type described comprising a resilient soft rubber base and a hard rubber substantially frictionless lip vulcanized to said base, said lip being adapted to be moved with respect to said base, due to the resiliency thereof.

2. A device of the type described comprising a resilient soft rubber base and a hard rubber substantially frictionless lip vulcanized to said base.

3. The combination with a frame and a movable window, of a soft rubber base, means for securing said base to said frame, and hard rubber lips secured to said base and arranged to contact with said window, said lips being held in close engagement with said window by the resiliency of said soft rubber base.

ARTHUR HERMAN ATZENHOFFER.